Jan. 17, 1961 J. E. ESHBAUGH 2,968,421
SAFETY RELEASE CLOSURES
Filed April 21, 1958 2 Sheets-Sheet 1
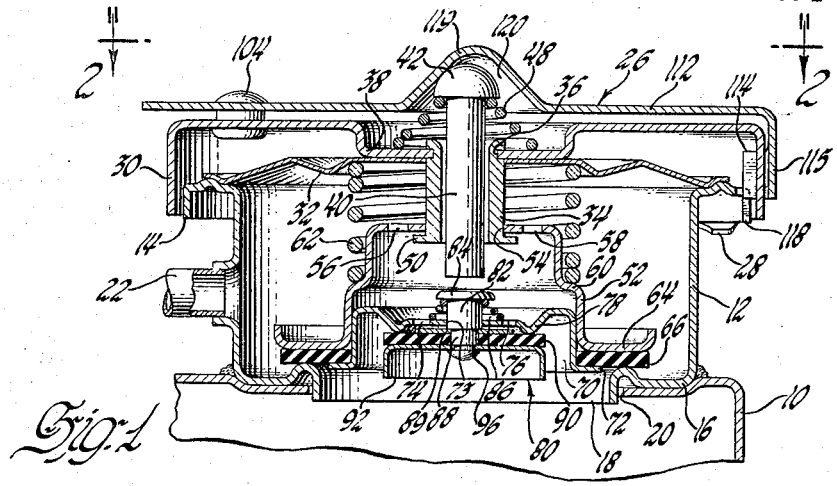
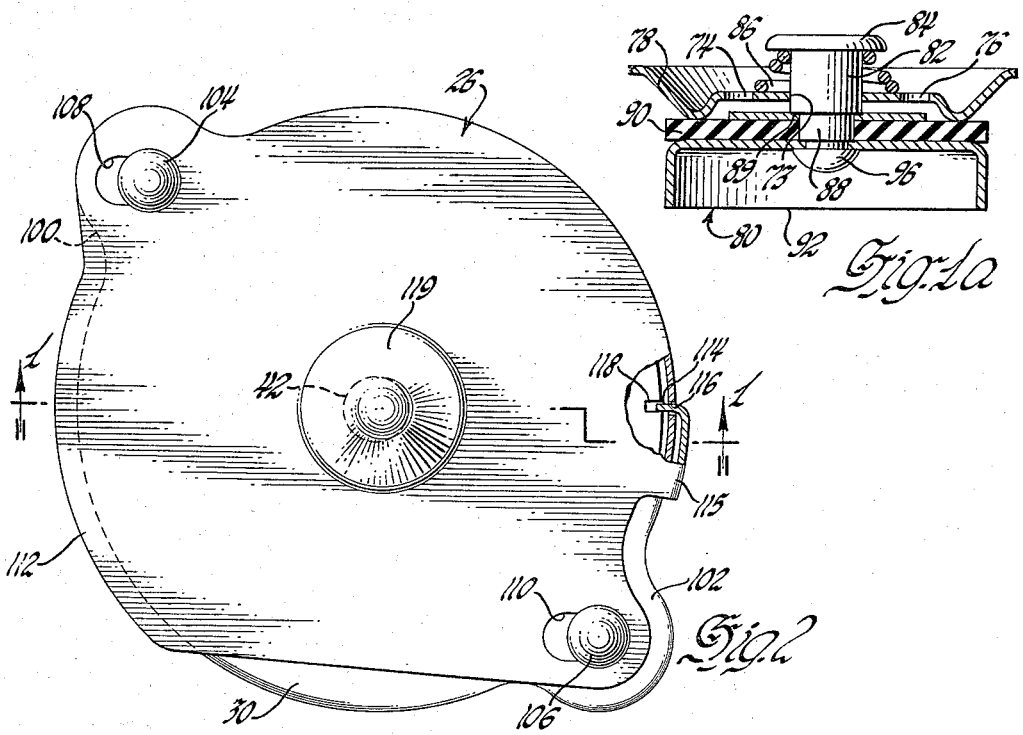
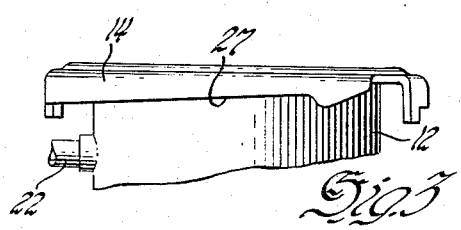
INVENTOR.
Jesse E. Eshbaugh
BY
J. W. Lovett
ATTORNEY Jan. 17, 1961  J. E. ESHBAUGH  2,968,421
SAFETY RELEASE CLOSURES
Filed April 21, 1958  2 Sheets-Sheet 2
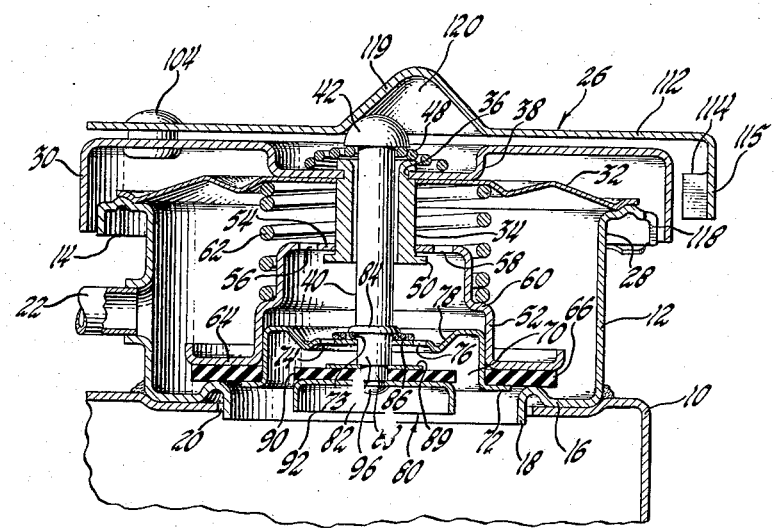
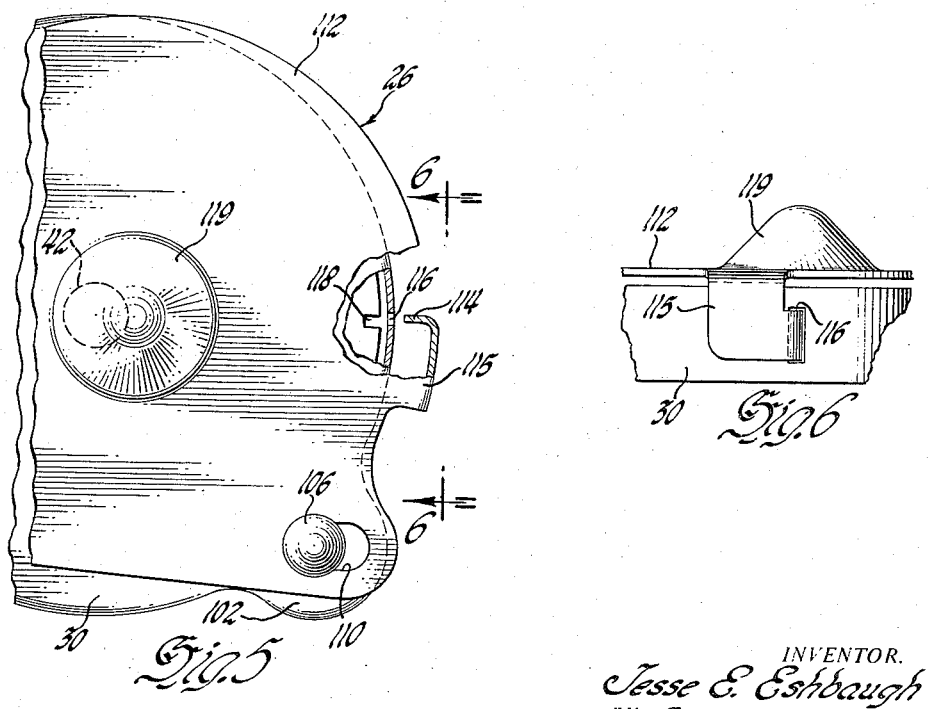
INVENTOR.
Jesse E. Eshbaugh
BY
ATTORNEY

United States Patent Office 2,968,421
Patented Jan. 17, 1961

2,968,421
SAFETY RELEASE CLOSURES

Jesse E. Eshbaugh, Flint, Mich., assignor to General Motors Corporation, Detroit, Mich., a corporation of Delaware Filed Apr. 21, 1958, Ser. No. 729,753

5 Claims. (Cl. 220—40)

This invention relates to closures on pressurized containers and more specifically to radiator caps for pressurized engine cooling systems, these caps being detachable from radiator filler necks.

Automotive radiators customarily are operated with coolant pressures substantially above atmospheric in order to increase the efficiency of the cooling systems and to conserve the coolant. Determination of the coolant level has involved the removal of the radiator caps and, if the systems are under pressure, this removal of the caps has often been attended by an ejection of the heated coolant from the radiator filler necks with resultant inconvenience and possible injury to the operators. In order to avoid such ejection various provisions have been made to first vent the systems to reduce the pressure before rotating and subsequently removing the caps from the radiators. Such provisions are satisfactory, but despite them operators are sometimes prone to forget the necessity of venting and the objectionable results continue to occur.

An object of the present invention is to provide an improved closure or cap which is rotatably detachable from a filler neck only upon first operating a vent means associated with the cap.

A feature of the invention is a closure provided with a safety measure comprising a sliding cover for operating a vent means as a required preliminary to releasing the closure from a filler neck of a container such as a radiator on an automobile.

The above and other important features of the invention will now be described in detail in the specification and then pointed out more specifically in the appended claims.

In the drawings:

Fig. 1 is a sectional view through a closure or cap as attached to the filler neck of an automotive radiator top tank to close the latter, the closure being one embodiment of the present invention and the section being taken looking in the direction of the arrows 1—1 of Fig. 2;

Fig. 1a shows some of the details of construction in Fig. 1 and is drawn to an enlarged scale;

Fig. 2 is a view of the filler cap shown in Fig. 1 looking in the direction of the arrows 2—2 and a portion being broken away to show a detail of the interior construction;

Fig. 3 is a fragmentary elevational view of the upper end of the filler neck of a vehicle radiator;

Fig. 4 is a view similar to that of Fig. 1 but with the parts arranged for venting a radiator as a step preliminary to removing the closure from the filler neck;

Fig. 5 is a view similar to that of Fig. 2 but showing the parts in the unlocked or vented position and consistent with the view of Fig. 4; and Fig. 6 is a detail of construction as looking in the direction of the arrows 6—6 in Fig. 5.

In Fig. 1 of the drawings, the top portion of a radiator tank or engine cooling system 10 is depicted and to which is attached, in customary manner, a tubular filler neck 12. The latter is provided with an out-turned annular shoulder 14 with cam flanges, as seen in Fig. 3, and an inner annular shoulder portion 16. These shoulder portions are coaxial and present spaced shoulders which face upwardly and outwardly from the radiator 10. The inner margin of the shoulder portion 16 terminates with an annular down-turned flange 18 which fits within an opening 20 formed in the upper wall of the tank 10. As is customary, the filler neck 12 is brazed to the tank and is fitted with a vent pipe 22 having one end which communicates with the atmosphere and its other end communicating with an intermediate interior zone of the neck between the two shoulders 14 and 16. This vent conducts excess coolant to the ground or some other convenient point of disposal of the overflow as is customary.

The outer margin of the shoulder portion 14 terminates in diagonally opposed and downwardly directed cam flanges by means of which a closure or cap generally indicated at 26 may be rotatably and detachably fixed in position for closing the radiator as is customary in such cases. A cam flange 27 is shown in Fig. 3. Cam means or in-turned tongues, such as the tongue 28, are provided on the cap to cooperate with the cam flanges; and the flange on the neck 12 is notched, as is conventional, to permit locating the cap on the neck rotatively as a preliminary or subsequent step in applying or releasing the cap. The tongues are integral with a main body portion 30 forming a part of the closure 26. Such cam means and cam flanges are as shown in the United States Patent 2,732,971, granted January 31, 1956, in the names of John R. Holmes and Adolf Schwarz.

A resilient sealing disk or element 32 of spring metal is attached to the main body portion 30 by means of a spool member or hollow rivet 34 which passes through the center of the body portion 26 and bears an annular groove 36 for tightly receiving the wall margin of a recessed portion 38 of the cap. The rivet 34 forms a bore loosely receiving a mechanical or valve actuating means constituting a plunger 40 having an upper end or head 42 which is in the form of a half-sphere. The lower end of the plunger 40 extends a slight distance below the bottom end of the rivet 34. A coil spring 48 surrounds the plunger 40 and extends from the recessed portion 38 to the underside of the head 42 thereby at all times urging the plunger 40 upwardly.

Spring loaded sealing means comprising an inverted cup 52 is retained in sliding engagement with the rivet 34. To this end, the cup 52 is provided with a central opening 54 and at opposite sides of this opening are provided two vent passages 56 and 58. Intermediate the axial length of the means or cup 52 is a shoulder portion 60 upon which is adapted to rest the lower coil of a coil spring 62. The upper end of this spring bears against the underside of the disk 32 and retains it in position contacting the underside of the recessed portion 38. The means or cup 52 is flanged at its lower end as at 64 to receive an annular sealing gasket 66. The proportions of the parts are such as when the cap 26 is applied as a closure to the filler neck 12, the spring disk 32 will engage or seat upon the shoulder portion 14 to form a seal and the member 52 will be lifted slightly from the rivet shoulder 50 as the gasket 66 engages or seats upon the shoulder portion 16.

Tightly received as a press fit within the confines of the cup 52 and the gasket 66 is an inverted cup member 70 having an out-turned flange 72 for retaining the gasket 66 in place on the flange 64. It will be noted that the cup 70 is provided with a central opening 73 as well as two diametrically opposed smaller openings 74 and 76. The two cups 52 and 70 cooperate as a sealing means for the opening defined by the flange 18. Around the openings 74 and 76 the cup 70 is provided with an annular depressed portion 78 forming a downwardly facing valve seat.

The inner valve means generally indicated at 80 is supported on the cup member 70 by means of a central pin 82 which extends upwardly through the opening 73 and is provided with a head 84. A coil spring 86 surrounds the pin 82 and bears against the underside of the head 84. The lower end of the pin is reduced in diameter as at 88 for the retention of a metal washer 89, a resilient sealing washer 90 and an inverted cup 92. The washer 90 is held between the metal washer 89 on the pin 82 and the cup 92 by a peened over head 96 formed on the pin 82. The resilient washer 90 is adapted to engage the valve seat on the cup member 70 because of the loading of the coil spring 86 when the closure parts are positioned as shown in Fig. 1. With the cap arranged in its operative and closed position on the filler neck, as shown in that figure, it will be seen that a slight clearance exists between the bottom of the plunger 40 and the top surface of the head 84 as the washer 90, as a part of the inner valve, closes or controls a passage through the cups 52 and 70.

The main body 30 of the closure is in the form of an inverted cup with a peripheral wall which is cylindrical for the most part in order closely to encompass the filler neck flange 14. The wall of this main body 30 would be completely cylindrical except for two diametrically opposed ear portions 100 and 102. These portions afford a better hand grip in turning the cap 26 with relation to the filler neck 12. Rivets 104 and 106 are firmly attached to the ears 100 and 102, respectively. These rivets pass through slots 108 and 110 formed in a cover 112 placed over the body member 30 as a part of the cap 26. The slots 108 and 110 are parallel with each other and also with the end 114 of a flange 115 made integral with the cover. This end portion 114 is a locking tongue which extends inwardly and registers with a vertical slot 16 formed in the cylindrical wall of the main body 30. This tongue or tab 114 is also of such length as to engage a vertical slot 118 formed in the annular rim of the filler neck 12 when the parts are arranged as shown in Figs. 1 and 2.

A central portion of the cover 112 bears a substantially conical portion 119 defining a downwardly facing recess 120. This recess is such as to accommodate the head 42 of the plunger 40. The wall of this recess is adapted to provide a cam surface for actuating the plunger 40 as will further appear.

With the cap or closure arranged in its operative position on the filler neck 12 as shown in Fig. 1, it will be seen that the gasket 66 is held in seated position by the spring 62 and also that the gasket 90 is held against the seat 78 by the spring 86. Assuming that it is desirable to check the level of coolant in the radiator 10, it is necessary to remove the cap 26 from the radiator neck. Such removal necessitates a turning of the main body 30 with respect to the neck but such turning is not possible as a first step as the tongue or tab 114 extends into the slot 118 of the neck. In order to turn the cap 26 or main body 30 with respect to the neck, the operator must first slide the cover 112 to the right from its position as viewed in Figs. 1 and 2, and place the cover into its unlocked position as illustrated in Figs. 4 and 5. The slots 108 and 110 permit such sliding motion and, when the unlocking motion is taking place, the plunger 40 is simultaneously depressed by cam action provided by the inclined surface in the recess 102 in the cover. Depression of the plunger 40 against the action of the spring 48 will cause the lower end of the plunger to engage the head 84 and comprises the spring 86. This will lower the gasket 90 from its seat 78 and vent the radiator by way of the openings 74 and 76 into the interior of the member 52. This interior is in communication with the atmosphere by way of the openings 56 and 58 and the vent pipe 22. With this venting of the radiator completed, the tongue 116 becomes released from the neck 12 and turning and subsequent removal of the cap 26 from the radiator neck 12 are steps which may safely be undertaken.

When the cap 26 is reapplied to the filler neck, a reversal in motion of the parts will again place them in their positions as depicted in Fig. 1 to re-establish a tight closure and the cover 112 will not rattle as the spring 48 acts to hold the cover up against the shoulders formed on the rivets 104 and 106.

I claim:

1. A closure for a pressurized container with a filler neck having a slot and also a vent interposed between two coaxial and spaced annular shoulders facing outwardly, said closure comprising a main body portion, a sealing disc fixed to said body portion and adapted to engage one of said annular shoulders, cam means for holding said body portion in sealing position on said neck, said cam means being effective upon rotation of said body portion in one direction relative to said neck to seal the latter with said disc, sealing means mounted on said body portion and adapted to engage the other of said annular shoulders, a passage leading through said sealing means and adapted to communicate with said vent by way of said neck, a valve resiliently controlling said passage, a plunger slidably mounted in and extending through said main body with one end facing said valve, a spring urging said plunger away from said valve, a cover slidably fixed to said main body and having a tongue adapted to register with said filler neck slot when said main body and disc are in sealing positions, a cam surface on said cover engaging the other end of said plunger, and the arrangement being such that sliding of said cover will open said valve by actuating said valve through engagement of said cam surface with said plunger and release said tongue from said slot for subsequent rotation of said body portion in the other direction.

2. A closure for a container filler neck having a slot in its periphery and a vent interposed between two shoulders facing outwardly, said closure comprising a main body portion, a sealing element fixed to said body portion and adapted to seat on one of said shoulders, cam means effective upon rotation of said body portion in one direction firmly to seat said sealing element and in the other direction to release said closure from said neck, sealing means mounted on said body portion and adapted to engage the other of said annular shoulders, a passage leading through said sealing means to a zone one side of said sealing element, a valve controlling said passage, a plunger extending through said sealing member and main body, a cover slidably mounted on the said main body, a tongue fixed to said cover and adapted to enter said neck slot, a cam surface on said cover, and the arrangement being such that manual sliding of said cover effects operation of said valve by interaction of said cam surface and plunger.

3. A closure such as set forth in claim 2 in which the sealing means comprises an inverted cup, the mounting of the cup being on a hollow rivet fixed to the main body, and a spring being interposed between the sealing element and the said cup urging the latter way from said main body.

4. A closure for a filler neck, the latter having a radial slot in its periphery at one end and an inner annular shoulder at its other end, said closure including an inverted cup adapted to seat on said shoulder, a vent in said cup, a valve in said cup controlling flow through said vent, a cover transversely slidable on and fixed to said closure and bearing a radially inwardly directed tongue adapted to move with said cover and enter and leave said slot in a plane parallel with that of said inner annular shoulder, and mechanical means supported by said closure and interposed between said cover and said valve whereby manually induced movement of said cover and its tongue in one direction with respect to the said filler neck and transverse to the latter serves to actuate said mechanical means in a vertical direction to open said vent valve.

5. A closure as set forth in claim 4 in which movement of said cover with respect to said cup in a direction opposite to said one direction disengages said mechanical means from said valve, and said valve has spring means in said cup constantly urging said valve to its closed position.

References Cited in the file of this patent

UNITED STATES PATENTS

| | | |
|---|---|---|
| 1,821,726 | Saporta | Sept. 1, 1931 |
| 2,591,562 | Levell | Apr. 1, 1952 |
| 2,732,971 | Holmes et al. | Jan. 31, 1956 |